Aug. 25, 1959 L. P. THOMAS, JR., ET AL 2,901,536

INTERCARRIER SOUND BUZZ REDUCING CIRCUIT

Filed May 31, 1955

INVENTOR.
LUCIUS P. THOMAS
BY CLYDE W. HOYT

ATTORNEY

United States Patent Office 2,901,536

Patented Aug. 25, 1959

2,901,536

INTERCARRIER SOUND BUZZ REDUCING CIRCUIT

Lucius Ponder Thomas, Jr., West Collingswood, and Clyde Warren Hoyt, Pennsauken, N.J., assignors to Radio Corporation of America, a corporation of Delaware Application May 31, 1955, Serial No. 512,224

3 Claims. (Cl. 178—5.8)

The present invention relates to improvements in intercarrier television receiving systems, as for example employed in the reception of sound signals in accompaniment to television broadcast reception.

Most television receivers designed for home use today employ intercarrier sound receiving systems. Intercarrier sound reception depends upon the heterodyne beat between the transmitted television picture carrier and the transmitted sound carrier as produced by a certain degree of non-linear amplifying action inherent in the television receiver circuit. The heterodyne beat comprises a frequency modulated carrier having a nominal frequency which is defined by the difference in frequency between the transmitted sound carrier and the transmitted picture carrier. In the United States the nominal frequency of this carrier is approximately 4.5 megacycles and it is sometimes referred to as the intercarrier sound signal carrier. That is, it is a carrier which results from the beat between two other carriers. Frequency modulation of the transmitted sound carrier, in accordance with FCC standards, will by heterodyne action produce corresponding frequency modulation of the intercarrier sound signal carrier.

It is extremely important in the design of an intercarrier sound receiving system to minimize fortuitous interference in the reproduced sound signal by undesired amplitude modulation of the intercarrier sound carrier. It is commonplace to find that the received television picture carrier is at times over-modulated or cross modulated to an extent which causes severe amplitude modulation of the intercarrier sound signal carrier at a rate corresponding to the vertical synchronizing pulse component of the received television signal. Although conventional amplitude limiting techniques imposed on the intercarrier sound signal carrier prior to sound frequency demodulation thereof tends to minimize the effects of this undesirable amplitude modulation, a residual "buzz" may be often heard produced by an intercarrier sound system which is directly attributable to amplitude modulation of the intercarrier signal at the vertical synchronizing pulse rate.

It is therefore an object of the present invention to provide improved means for minimizing the effects of undesirable modulation of an intercarrier sound signal by amplitude modulation components of the associated television carrier.

It is another object of the present invention to provide improved means for minimizing the commonplace "buzz" oftentimes present in television intercarrier sound systems attributable to undesired amplitude modulation of the intercarrier sound signal by synchronizing pulse components of the television signal.

In the realization of the above objects and features of advantage, the present invention employs frequency selective network means connected in a novel manner with the input circuit of one or more limiting amplifiers handling the intercarrier sound signal carrier prior to frequency discrimination or demodulation of the sound information. The network means is so arranged as to attenuate those amplitude variations in the intercarrier sound signal carrier corresponding to synchronizing pulse component. In one embodiment attenuation is accomplished by a simple series combination of resistor and capacitor connected in shunt with a portion of the input circuit of one or more of those intercarrier signal amplifiers employing control electrode current as a limiting means. Further attenuation of undesired amplitude variations may be effected by a frequency selective degenerative feedback network loop placed around the limiting amplifier.

A better understanding of the present invention as well as additional objects and features of advantage may be obtained through a reading of the following more detailed description, especially when taken in conjunction with the accompanying drawings wherein.

Figures 1, 2:
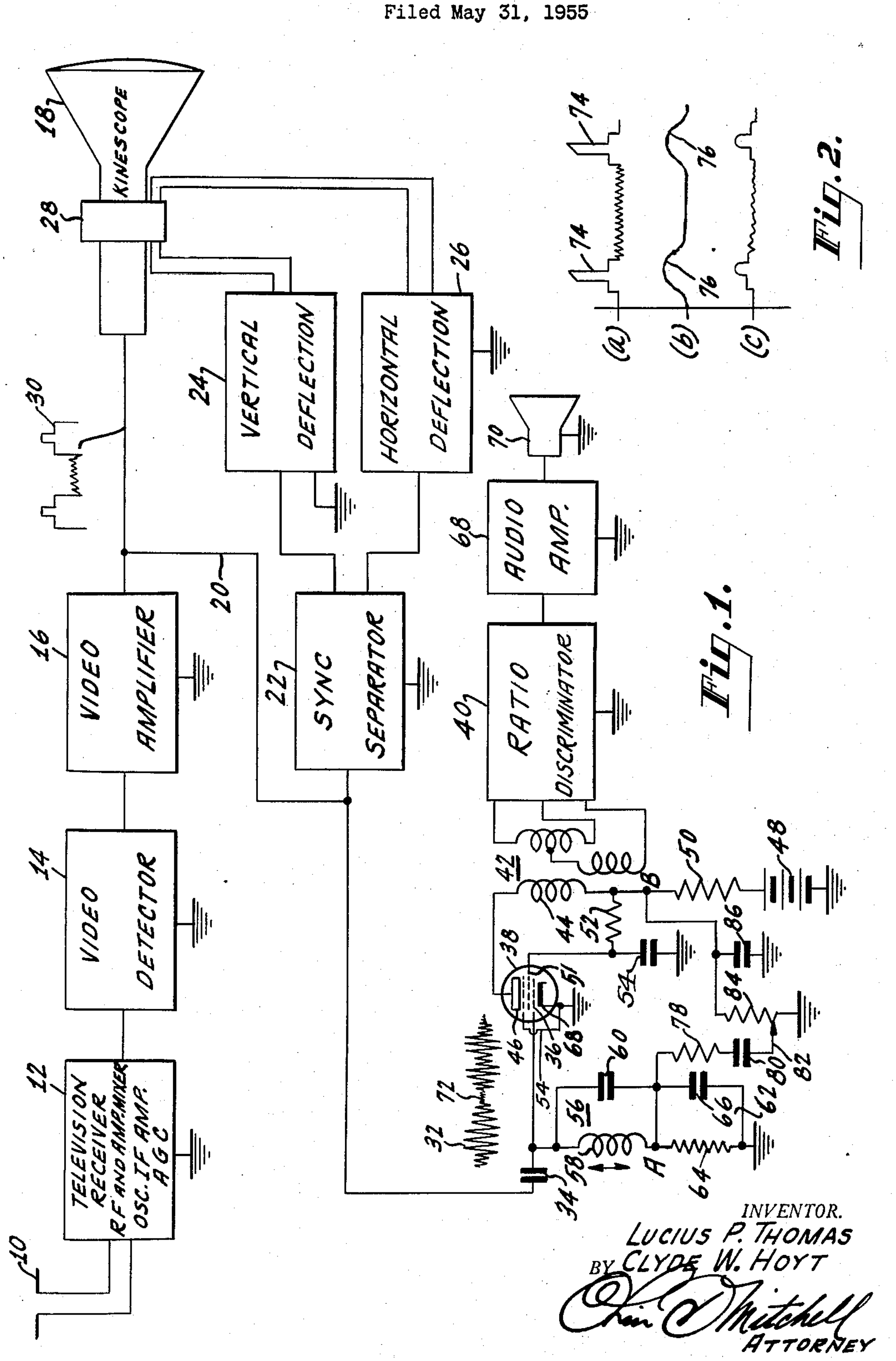
Figure 1 is a combination block and schematic representation of an intercarrier sound television receiver system embodying the present invention.
Figure 2 is a graphical representation of certain signal waveforms depicting possible modes of operation of the circuit arrangement shown in Figure 1 and helpful in the understanding of the present invention.

Turning now to Figure 1, there is shown at 10 a television receiving antenna operatively coupled with the television receiving elements represented by block 12. The elements indicated by block 12 may be conventional in nature and correspond to a radio frequency (RF) amplifier, superheterodyne mixer, superheterodyne oscillator, intermediate frequency (IF) amplifier and automatic gain control (AGC) circuit. The output of the intermediate frequency amplifier within block 12 is operatively coupled to a video detector circuit 14. Demodulated video signals appearing at the output of the video detector 14 are applied to the input terminal of the video amplifier 16. Amplified video signal is applied to the kinescope 18 for beam modulation and ultimate reproduction of visible television image. Composite television signal is also applied via circuit path 20 to the sync separator circuit 22. Separated horizontal and vertical deflection pulses from the sync separator 22 are applied to the vertical and horizontal deflection circuits 24 and 26 for timing thereof. Developed deflection signal from the vertical and horizontal deflection circuits are applied to the deflection yoke 28. The nature of the video signal delivered by the video amplifier is illustrated by the waveform 30.

Also, present at the output of the video amplifier 16, although not indicated per se by the waveform 30 is the conventional intercarrier sound signal carrier depicted by the waveform 32 and capacitively coupled via capacitor 34 to the control electrode 36 of the amplifier device 38. The amplitude of the intercarrier sound signal carrier 32 is generally some 30 db lower than the peak-to-peak amplitude of the video signal 30 and is comprised of the heterodyne difference beat between the television carrier and the television sound carrier (see U.S. patent to Parker, 2,488,908). The nominal frequency of the intercarrier sound signal carrier corresponds to the difference in frequency between the television picture carrier and the television sound carrier as received at the antenna 10. In the United States this frequency difference is standardized at approximately 4.5 megacycles. However, the instantaneous frequency of the intercarrier signal 32 will vary in accordance with sound transmission intelligence whereby after amplification by the amplifier device 38 the carrier may be applied to a standard frequency modulation discriminator or other frequency demodulation means such as a ratio detector circuit indicated in block form at 40. The ratio detector circuit 40 is coupled with the output of amplifier device 38 by means of a conventional ratio detector transformer 42, the primary winding 44 of which is connected in series between the anode 46 and a source of anode polarizing potential 48 through resistor 50 that forms, with shunt capacitor 86, the usual by-pass and decoupling impedance for the 4.5 megacycle intercarrier sound carrier. Polarizing potential for the screen electrode 51 is obtained from point B in the anode supply circuit through a filter network comprising series resistor 52 and a shunt capacitor 54. The input circuit for the limiting amplifier 38 comprises an input signal developing impedance means 56 comprising an adjustable inductor 58 and capacitor 60 tuned to the frequency of the intercarrier sound signal carrier. In series with the input signal developing impedance means 56 is a time constant bias developing means 62 comprising a resistance means 64 having connected in shunt therewith a capacitor 66. The input circuit comprising this series combination is connected between the control electrode 36 and the cathode 68 through circuit ground. Output signal from the detector 40 is conventionally applied to an audio amplifier 68 connected in driving relation to a sound reproducer 70.

The circuit thus far described is conventional in nature and its operation from this standpoint is straightforward. The bias developed in the time constant network 62 in the input circuit of the limiting amplifier 38 and the amplitude of signal 32 are so related that the bias on the amplifier 38 varies as a function of the amplitude of the signal 32. Thus bias on the amplifier 38 depends upon control electrode current flow between the control electrode 36 and the cathode 68 and in operation a limiting action is realized whereby the positive-going excursions of the intercarrier signal 32 are established at substantially the same potential reference with respect to ground by virtue of this control electrode current conduction. The limiting action thus attained tends to reduce amplitude variations in the intercarrier signal and reduce the burden on the discriminator 40 in cancelling out unwanted amplitude modulation of the intercarrier signal 32. However, as the television scene becomes whiter the tendency exists to over-modulate the picture carrier thereby producing voids or low amplitude intervals in the intercarrier signal 32 such as shown at 72. These voids correspond to the synchronizing component of the television signal. Whereas the horizontal synchronizing components appear at 15,750 cycles per second rate and are not objectionable from an audible standpoint, the vertical synchronizing pulses occurring at a 60 cycle per second rate are objectionable. If the intercarrier signal 32 has voids such as 72 produced in it, the limiting action of the amplifier 38 will be insufficient to prevent an audible "buzz" in the output of the sound reproducer 70.

The audible "buzz" produced by vertical synchronizing pulse interference is shown in various forms in Figure 2. The waveforms in Figures 2*a*, 2*b* and 2*c* are indicative of voltage variations appearing at terminal A of the input circuit to amplifier 38. Conventionally the waveform shown in Figure 2*a* will appear at terminal A as a result of excessive modulation of the television carrier or cross modulation thereof with the sound carrier such that synchronizing pulses are represented at considerable amplitude at 74. These synchronizing circuit pulse representations, especially when considered at the vertical repetition rate, are the cause of the objectionable "buzz" hereinbefore referred to. They correspond to the development at point A of positive-going excursions of bias attributable to the lack of carrier signal during the voids such as 72.

If it is desired to attenuate the excursions 74, a conventional approach would be to increase the size of the capacitor 66. However, this results in an integration of the disturbance such as shown by the waveform 76 in Figure 2*b* and increases the lower frequency components of the "buzz" disturbance. This is noticeably more annoying and objectionable to the user of the receiver.

In accordance with the present invention means are provided for attenuating the objectionable pulses with a substantially equal effect on all of the significant frequency components of the objectionable pulses so that the frequency components of the resulting pulses are substantially similar in nature and relative amplitude to the frequency components of the original pulses. In this way the amplitude of the pulses may be reduced without changing the character of the "buzz" to one which is more objectionable to the ear. This is shown by the curve in Figure 2*c*.

In accordance with the arrangement of the invention shown in Figure 1, a series combination of a resistor 78 and a capacitor 80 is utilized as a high pass network operatively connected in shunt with the time constant network 62. The value of the resistor 78 is made substantially smaller than the value of the resistor 64 so that at the frequencies at which the capacitor 80 appears as a low impedance, attenuation of the pulse component across resistor 64 is realized. The resistor 78 in series with the capacitor 80 prevents substantial integration of the waveform from occurring so that the frequency selective characteristics of the high pass network taken in combination with the low pass characteristics of the time constant network 62 result in a substantially non-frequency discriminatory attenuation of the pulse component. Further attenuation of the undesired pulse component may be obtained by adjusting the arm 82 up along the potentiometer 84 so that at least a portion of the signal appearing at point B in the output circuit is coupled to the input circuit of the amplifier. The capacitor 86 taken in combination with the resistor 50 provides in effect a low pass filter so that the signal feedback in the input circuit includes those signal frequencies only which are necessary to define the waveform characteristic of the pulses it is desired to attenuate.

In the practice of the present invention with the value of resistor 64 at 47,000 ohms, capacitor 66 at 56 mmfd., resistor 78 at 15,000 ohms and capacitor 80 .01 mfd. an attenuation of "buzz" component of close to 10 db can be realized with the arm of the potentiometer at circuit ground. By adjusting potentiometer arm 82 up along the potentiometer 84, virtually complete cancellation of the "buzz" component is possible. In many circuit applications cost may dictate that the low pass filter from the output circuit to the input circuit of the amplifier be omitted. In such cases the high pass filter comprising resistor 78 and capacitor 80 will provide significant attenuation of the unwanted "buzz" signal. Where additional cost may be tolerated, the degenerative feedback attenuation shown in cooperation with the already described high pass filter will give further improved performance.

Having thus described the invention, what is claimed is:

1. In an intercarrier sound type television receiver the combination of: a source of intercarrier sound signal of the type corresponding to the heterodyne beat between received television carrier and accompanying television sound carrier; an amplifier device having an anode, cathode and control electrode; an output circuit operatively connected between said anode and cathode and including an anode polarizing potential source; an input circuit for said amplifier connected between said control electrode and cathode, said circuit comprising the series combination of an input signal developing impedance means and a resistance means, said resistance means having in shunt therewith a capacitance means, the value of said capacitance means and resistance means being chosen to form a time constant bias developing means responsive to current flow in said input circuit to develop a varying operating bias for said amplifier such to produce a substantially constant amplitude output signal from said amplifier in the face of amplitude modulation of said intercarrier sound signal by video signal information; means coupling said signal source with said input signal developing impedance means with such signal polarity and amplitude as to produce input circuit current flow of a magnitude representing the amplitude of said intercarrier sound signal; a series combination of a capacitor and a resistor connected in series with one another, the value of said resistor being less than the value of said resistance means and value of said capacitor being greater than the value of said capacitance means; electrical connections operatively placing said series combination in shunt with said capacitance means; and a frequency modulation sound detector means operatively coupled with said output circuit to demodulate intercarrier sound signal as delivered amplified by said amplifier device.

2. In an intercarrier sound type television receiver the combination of: a source of intercarrier sound signal carrier bearing sound frequency modulation and fortuitously amplitude modulated in an undesirable manner by synchronizing components forming a part of the received television signal; an amplifier including an input circuit having in series connection means resonant to the carrier signal and a time constant circuit comprising a first resistor and first capacitor connected in parallel, across which time constant circuit a signal corresponding to said undesirable synchronizing component is developed; signal demodulating means connected with the output of said amplifier for demodulating said carrier, said demodulating means being responsive to said fortuitous modulation to produce a sound signal contaminated by synchronizing component having an audible disturbance frequency; a second capacitor of a value greater than said first capacitor; a second resistor of value less than said first resistor; means connecting said second resistor and second capacitor in series to form a correction network; and means connecting said correction network across said time constant network, the value of said first and second capacitors and resistors being so proportioned as to reduce the degree of sound signal contamination by said synchronizing component without substantially altering the waveform thereof over that present in the absence of said correction network.

3. The combination in accordance with claim 2, also including a low pass filter, means for coupling said low pass filter between the output of said amplifier and the input circuit of said amplifier, said low pass filter having a passband such as to enable said low pass filter to pass said undesirable synchronizing component and reject said intercarrier sound signal carrier.

References Cited in the file of this patent

UNITED STATES PATENTS 1,915,440 Nyquist ............... June 27, 1933
2,034,226 Carter ............... Mar. 17, 1936

OTHER REFERENCES

Rider's Manual, volume 11, Emerson, page 11–9.